United States Patent [19]
Butler

[11] 3,834,715
[45] Sept. 10, 1974

[54] PRESSURE SEAL ASSEMBLY

[75] Inventor: Albert O. Butler, Odessa, Tex.

[73] Assignee: Dart Industries Inc., Los Angeles, Calif.

[22] Filed: Apr. 26, 1972

[21] Appl. No.: 249,442

[52] U.S. Cl............... 277/1, 277/59, 277/74, 277/75
[51] Int. Cl............................................. F16j 15/40
[58] Field of Search............... 277/1, 15, 16, 59, 60, 277/61, 58, 70–74, 124, 68, 69

[56] References Cited
UNITED STATES PATENTS

| | | | |
|---|---|---|---|
| 1,738,619 | 12/1929 | Stuthridge et al. | 277/58 |
| 2,365,263 | 12/1944 | Gora | 277/124 |
| 2,673,103 | 3/1954 | Tremolada | 277/32 |
| 2,686,068 | 8/1954 | Lewis | 277/61 |
| 2,818,284 | 12/1957 | Stevens | 277/16 |

Primary Examiner—Louis R. Prince
Assistant Examiner—Robert I. Smith
Attorney, Agent, or Firm—Sheldon H. Parker; Fred S. Valles

[57] ABSTRACT

An improved pressure seal assembly is provided having an increased life span which comprises a lantern ring having an inlet to receive a sealing fluid and at least one outlet through which the sealing fluid passes, sealing fluid means in fluid communication with the inlet and outlet in the lantern ring for supplying a sealing fluid therethrough, and at least one chevron type packing ring located on each side of the lantern ring and having its convex surface thereof facing away from the lantern ring.

7 Claims, 4 Drawing Figures

PRESSURE SEAL ASSEMBLY

BACKGROUND OF THE INVENTION

The present invention relates to an improved pressure seal assembly for use in feeding and pumping systems. More particularly, this invention relates to an improved assembly to provide a pressure barrier seal in high pressure pumping and intensifier systems.

Chevron type packing ring assemblies have been widely used in feeding and high pressure pumping systems in the prior art; see Hadley et al., U.S. Pat. No. 3,219,208 and *High Pressure Technology* by Edward W. Comings, McGraw-Hill Book Company (1956) page 153. One of the chief disadvantages of such packing ring assemblies is that a path often develops for the leakage of process fluid to the atmosphere because of wear created in the pump shaft or in the chevron rings, insufficient tightening of the packing and improper dimensioning of the shaft and/or packing ring housing. Another related disadvantage is that foreign particles in the system, e.g., solid particles, are carried by the process fluid between the chevron rings. These solid particles also form paths of leakage and act as wedges to separate the chevron rings from the shaft and interior wall of the packing housing against which the rings must rest. A still further disadvantage of such packing ring assemblies is that they require the use of mechanical springs to provide the force necessary to maintain a constant axial force on the chevron rings. Mechanical springs have the disadvantages of providing only a limited range of force, of requiring a considerable amount of space within the barrier seal system, and of being susceptible to breakage.

It is well known to provide the packing with lubrication; see *Pump Manual* prepared by The Subcommittee on Pumps of the Equipment Testing Procedures Committee of the American Institute of Chemical Engineers (1960) page 37. However, the manner in which the lubrication was added to the packing failed to overcome the disadvantages noted above in connection with the prior art packing assemblies. As a result the prior art assemblies have a relatively short life span and are frequently replaced.

SUMMARY OF THE INVENTION

In accordance with this invention there is provided a pressure seal assembly which overcomes the above mentioned disadvantages and which enables it to be used in pumping and intensifier systems for longer periods of time than prior art assemblies. Briefly, the pressure seal assembly of this invention comprises a lantern ring having an inlet to receive a sealing fluid and at least one outlet through which the sealing fluid passes, sealing fluid means in fluid communication with the inlet and outlet in the lantern ring for supplying a sealing fluid therethrough and at least one chevron type packing ring located on each side of the lantern ring and having its convex surface thereof facing away from the lantern ring.

BRIEF DESCRIPTION OF THE DRAWINGS

The invention and the manner in which it distenguishes from the prior art will be apparent from the description when read in conjunction with the drawings in which.

DESCRIPTION OF ONE EMBODIMENT OF THIS INVENTION

Figure 1:
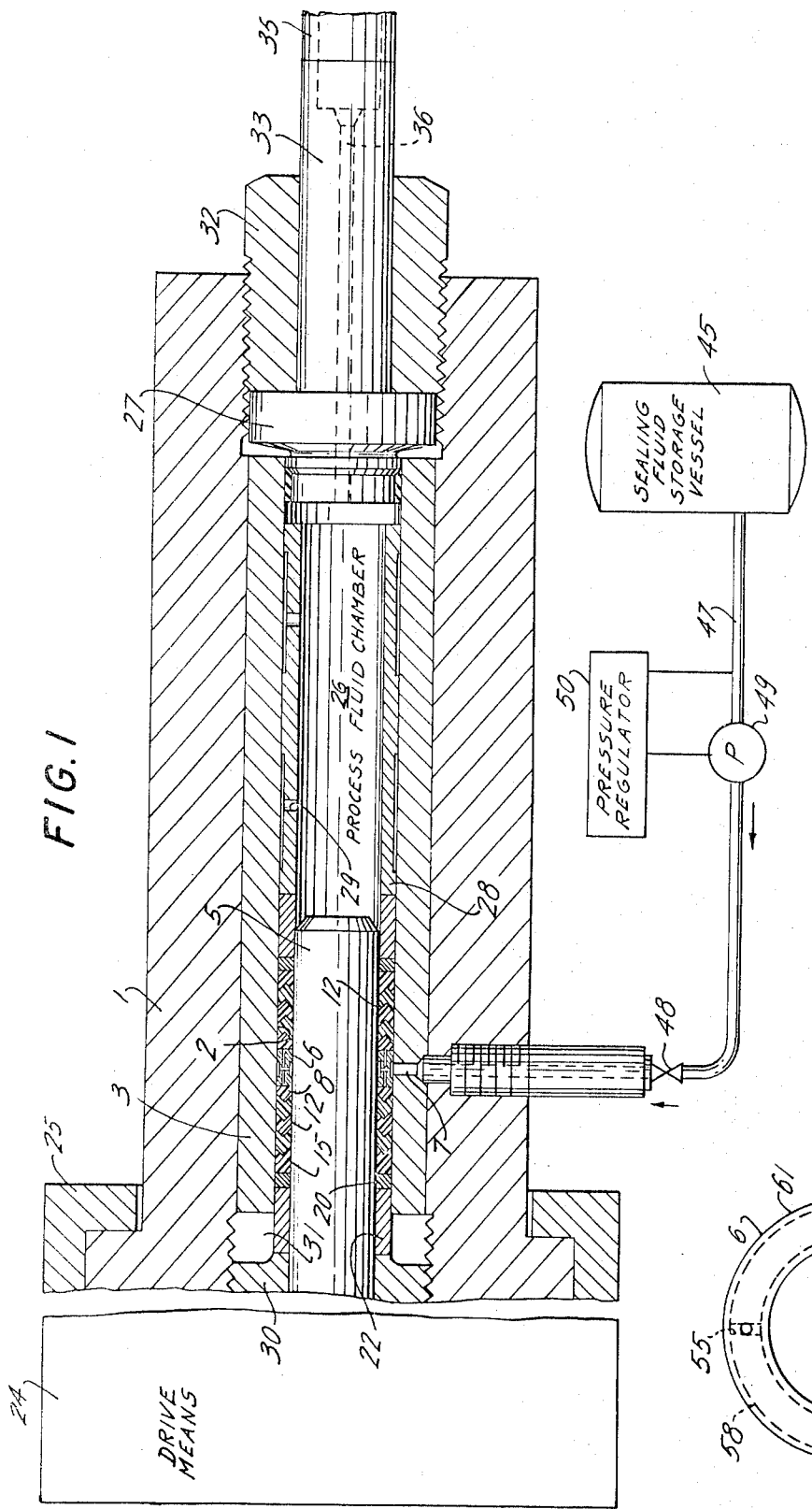
FIG. 1 is a longitudinal section of a cylinder assembly of an intensifier system employing the pressure seal assembly in accordance with the present invention.
Figure 2:
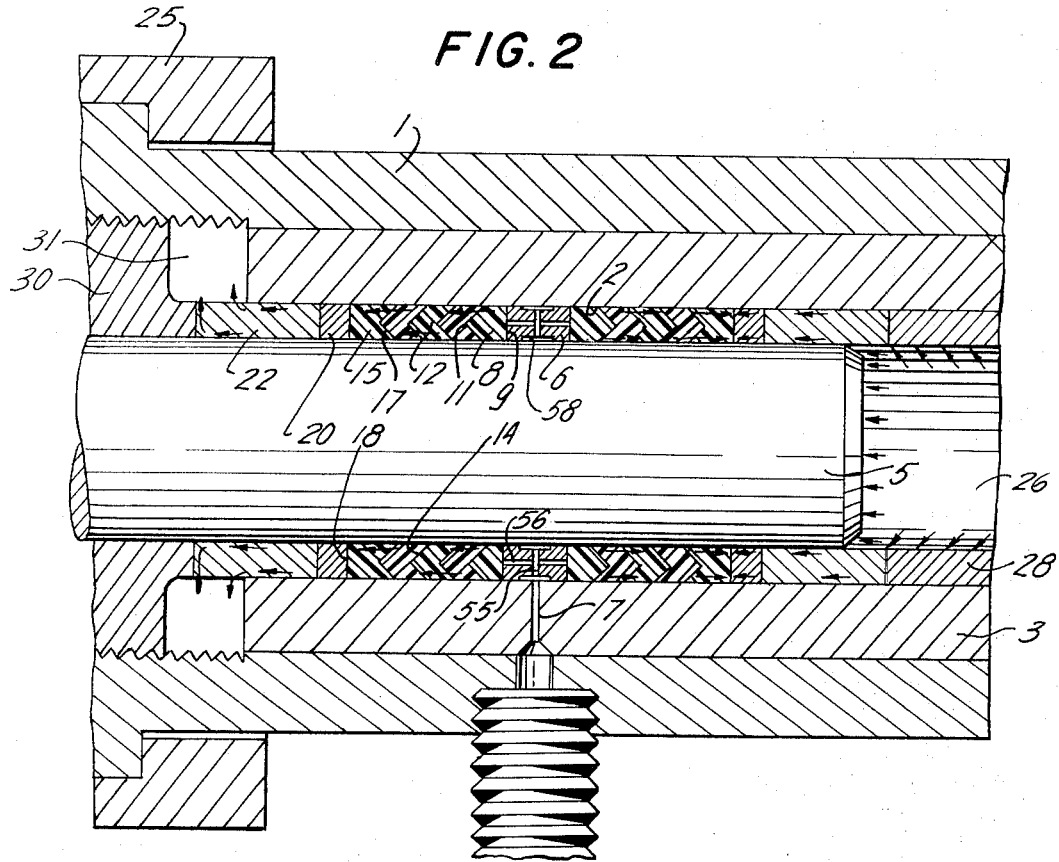
FIG. 2 is a portion of the longitudinal section of the cylinder assembly shown in FIG. 1.

Referring now to FIGS. 1 and 2, there is illustrated a longitudinal section of the cylinder assembly comprising cylinder 1 having central bore 2 and liner 3 housing the pressure seal assembly of this invention which encircles plunger 5. The pressure seal assembly comprises lantern ring 6 which is in fluid communication with the sealing or pressurizing fluid system by means of sealing fluid inlet 7. Middle follower ring 8 is located on each side of lantern ring 6 and has a radially extending side wall 9 in contact with one of the radially side walls of lantern ring 6. Ring 8 also has a second side wall which has a convex surface forming nose 11. There are shown chevron type packing rings 12 on each side of middle follower ring 8. Each one of rings 12 has side wall 14 in contact with one of the respective second side walls of middle follower ring 8. Side wall 14 has a concave surface forming the lips of the chevron, which surface is capable of receiving the second wall of ring 8. Each of rings 12 also has a convex surface which forms the nose of the chevron pointing away from middle follower ring 8. Although rings 12 are shown with sharp pointed noses, this feature is not critical to the invention. The convex surface of the chevron type packing rings can be truncated, rounded or similarly shaped so that a distinct nose is formed which is of smaller cross-sectional diameter than the inside diameter of liner 3 within cylinder 1.

Outer follower ring 15 is located on each side of the chevron type packing rings. Each outer follower ring 15 has side wall 17 in contact with the respective side wall of the outermost of rings 12 and radially extending side wall 18. Backup ring 20 is located on each side of outer follower ring 15 and each has its first radially extending side wall in contact with radially extending side wall 18 of outer follower ring 15. The second raially extending side wall of each backup ring 20 is in contact with the side wall of each respective plunger guide bushing 22.

The middle follower ring 8, the chevron type packing rings 12 and the outer follower ring 15 on each side of lantern ring 6 preferably form a pliable portion of the entire packing ring assembly. Examples of pliable materials which are suitable for this purpose include rubber, plastic and leather. The specific selection of material for the pliable portion of the packing ring assembly depends on the particular type of sealing fluid and process fluid employed in the intensifier system since the material must be resistant to the fluids it comes in contact with.

As shown in FIG. 1, drive means 24 for imparting reciprocating movement to plunger 5 is schematically represented and is connected to the cylinder assembly of the intensifier by means of backing collar 25. Drive means 24 may be any one of a number of mechanical, pneumatic, hydraulic, electrical systems or combinations of systems which are well known in the art and are not critical to the present invention.

A process fluid chamber 26 is formed between the end of plunger 5 and top closure 27 and within liner 3. Sleeve 28 is loosely fitted within liner 3 and contains pressure equalizing holes 29. Lower closure nut 30 is threadably engaged within cylinder 1 forming annular space 31 which is at substantially atmospheric pressure. Upper closure nut 32 is also threadably engaged within cylinder 1 and loosely encircles neck 33 of top enclosure 27. Conduit 35 through which process fluid is received from a feed source (not shown) is connected to neck 33 by any conventional means. Orifice 36 places chamber 26 in fluid communication with conduit 35. As plunger 5 is drawn back into the position as shown by drive means 24, chamber 26 fills with process fluid from the feed source. The valve system (not shown) connected downstream of conduit 35 is then positioned in such a manner as to divert the process fluid into a process system (not shown).

U.S. Pat. Nos. 3,234,882 and 3,234,883 provide a good description of one example of an intensifier assembly system into which the pressure seal assembly of this invention may be enployed, which description is incorporated herein by reference.

The sealing fluid system of the present invention comprises sealing fluid storage vessel 45 and conduit 47 and check valve 48 through which is pumped sealing fluid into sealing fluid inlet 7 by means of pump 49. The sealing fluid is regulated by means of pressure regulator 50 to a pressure, $P_2$, which is at least equal to and preferably greater than process fluid pressure, $P_3$. $P_3$ can range from atmospheric pressure to pressures of 100,000 psi and even higher. If $P_2$ is greater or equal to $P_3$, process fluid leakage is eliminated. The only leakage of fluid from the system that can occur in the pressure seal assembly of the present invention is that of sealing fluid which could flow through leakage paths indicated by arrows in FIG. 2 and described under BACKGROUND OF THE INVENTION. Specifically, sealing fluid flows from sealing fluid inlet 7 through orifices 55 and 56 in lantern ring 6, the chevron type packing rings 12 to the left of lantern ring 6 and into chamber 31 at substantially atmospheric pressure, $P_1$. Similarly, sealing fluid flows through the orifices of lantern ring 6, rings 12 to the right of lantern ring 6 and into process fluid chamber 26. Since all of rings 12 are pointing away from sealing inlet 7, the source of sealing fluid, the force of sealing fluid tends to push and compress the rings and to flare out the lips into a tighter force against the inner walls of liner 3 and the walls of plungr 5. Therefore, most of the leakage is contained within the pressure seal assembly of this invention and not out of the system into annular space 31 or into process fluid chamber 26. In certain instances the sealing fluid is a lubricant in which case the small amount of leakage that occurs is beneficial in that it maintains constant lubrication to plunger 5 and the packing rings themselves which thus reduces their wear and increases the life span of the entire intensifier packing assembly.

Figure 3:
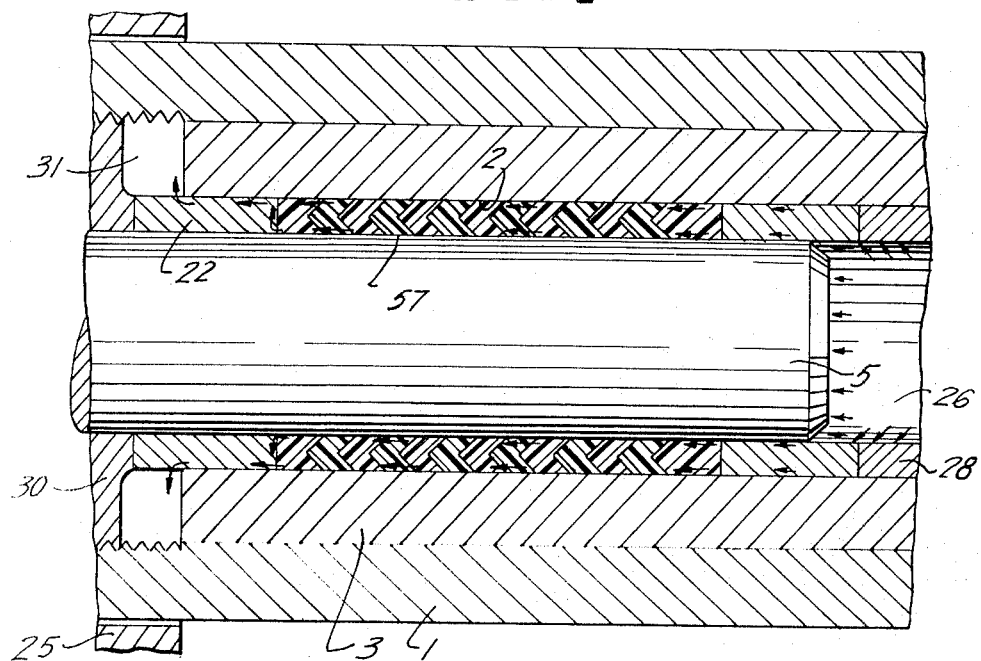
FIG. 3 is a portion of the longitudinal section of a cylinder assembly of an intensifier system employing a packing ring assembly of the prior art.

Referring now to FIG. 3, there is illustrated a portion of the longitudinal section of the cylinder assembly of an intensifier system employing prior art packing assembly 57. The leakage of process fluid is indicated by arrows from process fluid chamber 26 through packing assembly 57 into annular space 31.

Figure 4:
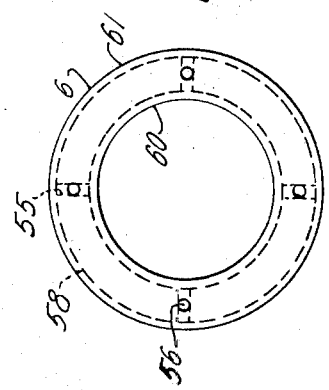
FIG. 4 is a view of a radially extending side wall of the lantern ring of the pressure seal assembly of this invention.

Referring to FIG. 4, a view of lantern ring 6 is illustrated with orifices 56 located in its radially extending side wall. Channel 58 is cut into inner circumferential surface 60 and outer circumferential surface 61 of lantern ring 6. Four orifices 55 are located in circumferential surface 61 and intersect orifices 56. The openings of orifices 55 and 56 of lantern ring 6 which are adjacent to plunger 5 and radially extending side walls 9, respectively, provide the necessary outlet for the sealing fluid which forms a critical feature of this invention.

The foregoing description is illustrative of only one of many possible embodiments which incorporate the pressure seal assembly of the present invention. The assembly is useful with both reciprocating plungers and rotating shafts.

What is claimed is:

1. A pressure seal assembly having in combination:
   a. a lantern ring having in its outer circumference an inlet opening connecting with passageways therethrough providing direct fluid access to each side thereof,
   b. means to supply a sealing fluid under pressure to said inlet opening, and
   c. at least one chevron type packing ring located to each side of said lantern ring and cooperatively aligned therewith so that the concave side of said packing ring faces toward said lantern ring.

2. The pressure seal assembly of claim 1 wherein a follower ring is cooperatively positioned between each side of said lantern ring and said cooperatively aligned chevron type packing ring located to the respective side of said lantern ring.

3. The pressure seal assembly of claim 2 wherein the side of said follower ring which is away from said lantern ring is shaped to fit inside of the concave side of the adjacent chevron type packing ring.

4. A pressure seal assembly having in combination:
   a. a lantern ring having radially extending walls on each side, an inlet opening for sealing fluid in its outer circumference, at least one outlet opening in each side wall thereof, and internal passageways from said inlet opening to said outlet openings providing fluid communication therebetween,
   b. a middle follower ring on each side of said lantern ring, each of said follower rings having a radially extending side wall in contact with the adjacent side wall of said lantern ring and a convex surface facing away from said lantern ring on its other side,
   c. a packing ring immediately adjacent to each of said middle follower rings said packing ring having a concave side in direct contact with the convex surface of said follower ring and on its other side a convex surface facing away from said follower ring,
   d. at least one additional packing ring located to each side of said lantern ring, said additional packing ring having a concave side in contact with the convex surface of the packing ring described in (c) and a convex surface on its other side, and
   e. an outer follower ring located to the outside of the outermost packing ring described in (d) on each side of said pressure seal assembly, said outer follower ring having a concave side wall in contact with the convex surface of said outermost packing ring and a radially extending side wall on its outer side.

5. The pressure seal assembly of claim 4 wherein a back-up ring is located next to each of said outer follower rings, said back-up ring having radially extending side walls on each side thereof.

6. A method of providing a pressure seal around a cylindrical pumping element supplying a system with process fluid under high pressure which comprises:

a. surrounding said pumping means with an annular seal assembly which includes a lantern ring having an inlet opening in its outer circumference and connecting passageways through same providing direct fluid access to each side thereof combined with at least one chevron type packing ring located to each side of said lantern ring aligned with the concave side of said packing ring facing toward said lantern ring and b. supplying a sealing fluid to the inlet opening of said lantern ring under a pressure sufficient to urge apart the lip portions of the tapering wall sections surrounding the concave oortion of said chevron type packing rings.

7. The method of claim 6 in which the sealing fluid is supplied under a pressure which is at least equal to the process fluid pressure in said system.

* * * * *